United States Patent
Beardsley (10) Patent No.: US 6,781,618 B2
(45) Date of Patent: Aug. 24, 2004

(54) HAND-HELD 3D VISION SYSTEM

(75) Inventor: Paul Beardsley, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 379 days.

(21) Appl. No.: 09/923,884

(22) Filed: Aug. 6, 2001

(65) Prior Publication Data

US 2003/0025788 A1 Feb. 6, 2003

(51) Int. Cl.[7] .............................................. H04N 13/00
(52) U.S. Cl. ........................................ 348/43; 382/154
(58) Field of Search .............................. 348/39, 36, 38, 348/155, 143, 47, 42, 151, 153, 159, 158; 382/106, 107, 154

(56) References Cited

U.S. PATENT DOCUMENTS

| | | | | |
|---|---|---|---|---|
| 5,259,037 A | * | 11/1993 | Plunk | 382/154 |
| 5,657,073 A | * | 8/1997 | Henley | 348/38 |
| 5,699,444 A | * | 12/1997 | Palm | 382/106 |
| 6,094,215 A | * | 7/2000 | Sundahl et al. | 348/42 |

* cited by examiner

*Primary Examiner*—Chris Kelley
*Assistant Examiner*—Behrooz Senfi
(74) *Attorney, Agent, or Firm*—Dirk Brinkman; Andrew J. Curtin (57) ABSTRACT

A 3D model of a scene is constructed by acquiring first images of a scene having unknown characteristics with a first camera. Corresponding second images of a another scene having known characteristics are acquired by a second camera. The first and second cameras have a fixed physical relationship to each other. Only the second images are analyzed to determine corresponding positions of the second camera while acquiring the first images. Then, the first images are assembled into the 3D model using the corresponding positions and the fixed physical relationship of the first and second camera.

24 Claims, 12 Drawing Sheets

HAND-HELD 3D VISION SYSTEM

FIELD OF THE INVENTION

This invention relates generally to the field of three-dimensional virtual reality environments and models, and, more particularly, to building virtual reality world models from multiple-viewpoint real world images of scenes.

BACKGROUND OF THE INVENTION

In the field of computer graphics, there is a need to build realistic three-dimensional (3D) models and environments that can be used in virtual reality walk-throughs, animation, solid modeling, visualization, and multimedia. Virtual reality environments are increasingly available in a wide variety of applications such as marketing, education, simulation, entertainment, interior and architectural design, fashion design, games and the Internet to name but a few.

Many navigable virtual environments with embedded interactive models tend to be very simplistic due to the large amount of effort that is required to generate realistic-3D virtual models behaving in a realistic manner. Generating quality virtual reality scene requires sophisticated computer systems and a considerable amount of hand-tooling. The manual 3D reconstruction of real objects, by using CAD-tools is usually time consuming and costly.

The Massachusetts Institute of Technology, the University of Regina in Canada, and Apple Computer, Inc. jointly created the "*Virtual Museum Project*" which is a computer-based rendering of a museum which contains various objects of interest.

As the user moves through the virtual museum individual objects can be approached and viewed from a variety of perspectives.

Apple Computer also has developed the Quicktime VR™ system that allows a user to navigate within a virtual reality scene generated from digitized overlapping photographs or video images. However, warping can distort the images so that straight lines appeared curved, and it is not possible to place 3D models in the scene.

Three-dimensional digitizers are frequently used to generate models from real world objects. Considerations of resolution, repeatability, accuracy, reliability, speed, and ease of use, as well as overall system cost, are central to the construction of any digitizing system. Often, the design of a digitizing system involves a series of trade-offs between quality and performance.

Traditional 3D dimensional digitizers have focused on geometric quality measures for evaluating system performance. While such measures are objective, they are only indirectly related to an overall goal of a high quality rendition. In most 3D digitizer systems, the rendering quality is largely an indirect result of range accuracy in combination with a small number of photographs used for textures.

Prior art digitizers include contact digitizers, active structured-light range-imaging systems, and passive stereo depth-extraction. For a survey, see Besl "*Active Optical Range Imaging Sensors,*" Advances in Machine Vision, Springer-Verlag, pp. 1-63, 1989.

Laser triangulation and time-of-flight point digitizers are other popular active digitizing approaches. Laser ranging systems often require a separate position-registration step to align separately acquired scanned range images. Because active digitizers emit light onto the object being digitized, it is difficult to capture both texture and shape information simultaneously. This introduces the problem of registering the range images with textures.

In other systems, multiple narrow-band illuminates, e.g., red, green, and blue lasers, are used to acquire a surface color estimate along lines-of-sight. However, this is not useful for capturing objects in realistic illumination environments.

Passive digitizers can be based on single cameras or stereo cameras. Passive digitizers have the advantage that the same source images can be used to acquire both structure and texture, unless the object has insufficient texture.

Image-based rendering systems can also be used, see Nishino, K., Y. Sato, and K. Ikeuchi, "*Eigen-Texture Method: Appearance Compression based on 3D Model,*" Proc. of Computer Vision and Pattern Recognition, 1:618–624, 1999, and Pulli, K., M. Cohen, T. Duchamp, H. Hoppe, L. Shapiro, and W. Stuetzle, "*View-based Rendering: Visualizing Real Objects from Scanned Range and Color Data,*" Proceedings of the 8th Eurographics Workshop on Rendering, pp. 23–34, 1997. In these systems, images and geometry are acquired separately with no explicit consistency guarantees.

In image-based vision systems, there are two inherent and some what related problems. The first problem has to do with deducing the camera's intrinsic parameters. Explicit calibration of intrinsic parameters can be circumvented in specialized processes but is common in many existing systems. The second problem is concerned with estimating the camera's extrinsic parameters i.e., camera position/motion relative to the environment or relative to the object of interest. Estimating the camera positions is an essential preliminary step before the images can be assembled into a virtual environment.

The terms 'camera position' and 'camera motion' are used interchangeably herein, with the term 'camera position' emphasizing the location and the orientation of a camera, and the term 'camera motion' indicating a sequence of camera positions as obtained, for example, from a sequence of images.

The first problem, of calibrating a camera's intrinsic parameters, is well studied. Solutions for calibrating a single camera are too many to enumerate. Solutions for calibrating stereo cameras are also well known. There, the simple requirement is to have some overlap in the images acquired by the stereo cameras. Calibrating rigid multi-camera systems where there is no overlap of the viewed scene in the different cameras has, however, not been the subject of previous work.

In the prior art, the second problem, of estimating camera position, can be solved in a number of ways. For generating a 3D model of a portable object, one method rigidly fixes the cameras at known locations, and rotates the object on a turntable through precise angular intervals while taking a sequence of images. Great care must taken in setting up and maintaining the alignment of the cameras, object, and turntable. Therefore, this type of modeling is usually done in a studio setting, and is of no use for hand-held systems.

Another method for generating a 3D model of an object of interest assumes a known "position-registration pattern" somewhere in the field of view. The term "position-registration pattern" is used here to indicate a calibration pattern that enables computation of the camera position relative to the pattern, in a fixed coordinate frame defined by the pattern. For example, a checkerboard pattern is placed behind the object while images are acquired. However, this method for computing camera position also has limitations.

First, it is difficult to view the object from all directions, unless the position-registration pattern is relocated and the system is re-calibrated. Second, the presence of the pattern makes it more difficult to identify the boundary of the object, as a precursor to further processing for building a 3D model, than would be the case with a bland, low-texture background.

Obviously, the two techniques above are not practical for imaging large-scale, walk-through environments. In that case, the varying position of architectural details in the image, as the camera is moved, can be used to determine camera motion. However, these scenes often includes a large amount of extraneous movement or clutter, such as people, making it difficult to track image features between successive images, and hence making it difficult to extract camera position.

Motion parameters are more easy to resolve when the camera has a wide field of view, because more features in a scene are likely to be visible for use in the motion computation, and the motion computations are inherently more stable when features with a wide angular spacing relative to the observer are used. Computation of camera position/motion is also easier when working from images of rigid structure, or known geometry. However, high-quality color images may not be necessary.

But wide field of view images contain distortion which is usually too great for the images to be of use with applications that are concerned with geometric accuracy. Methods exist for removing the distortion, but the corrected images generally suffer from a loss of quality. Furthermore, a wide field of view means that there are fewer pixels viewed for any given angle of view.

Thus the desire for computing camera position/motion conflicts with the desire for generating a 3D model of an object or environment. Computing camera motion works best with a wide field of view, and known scene characteristics such as rigidity or known geometry, and absence of scene characteristics such as specular or transparent surfaces which can adversely affect the recovery of position. But 3D scanning can involve applications where the environment is uncontrolled e.g., independent motion can impact the ability to collect reliable estimates of camera position/motion, or there may be a lot of clutter making automatic analysis difficult. A narrow field of view camera is preferable for acquiring the images used to make a 3D model, because this type of camera allows more detailed information to be collected per image than a wide-angle camera at the same distance.

Further, computing camera position can work acceptably with cheaper monochrome cameras, whereas scanning a 3D model generally requires high-quality color imagery to acquire details of surface texture, Therefore, when building a 3D virtual model from images, there are conflicting requirements which are not being met by traditional vision systems.

SUMMARY OF THE INVENTION

The invention provides a method for constructing a 3D model of a scene, by acquiring first images of a first scene having unknown characteristics with a first camera. Corresponding second images of a second scene having known characteristics are acquired by a second camera. The first and second cameras having a fixed physical relationship to each other. Only the second images are analyzed to determine corresponding positions of the second camera while acquiring the first images, and only the first images are assembled into a 3D model using the determined corresponding positions and the fixed physical relationship of the first and second camera. The 3D model can then be rendered on a display device. The known characteristics of the second scene can include a rigid structure, a position-registration pattern, or a fixed set of visual beacons, each with a unique distinguishable identity. Furthermore, the images can be obtained without constraining motions of the first and second cameras. In one embodiment, the first camera is oriented at right angles with respect to the second camera, and the first and second cameras each have a field of view less than 90°.

DETAILED DESCRIPTION OF THE PREFERRED EMBODIMENT

Figure 1:
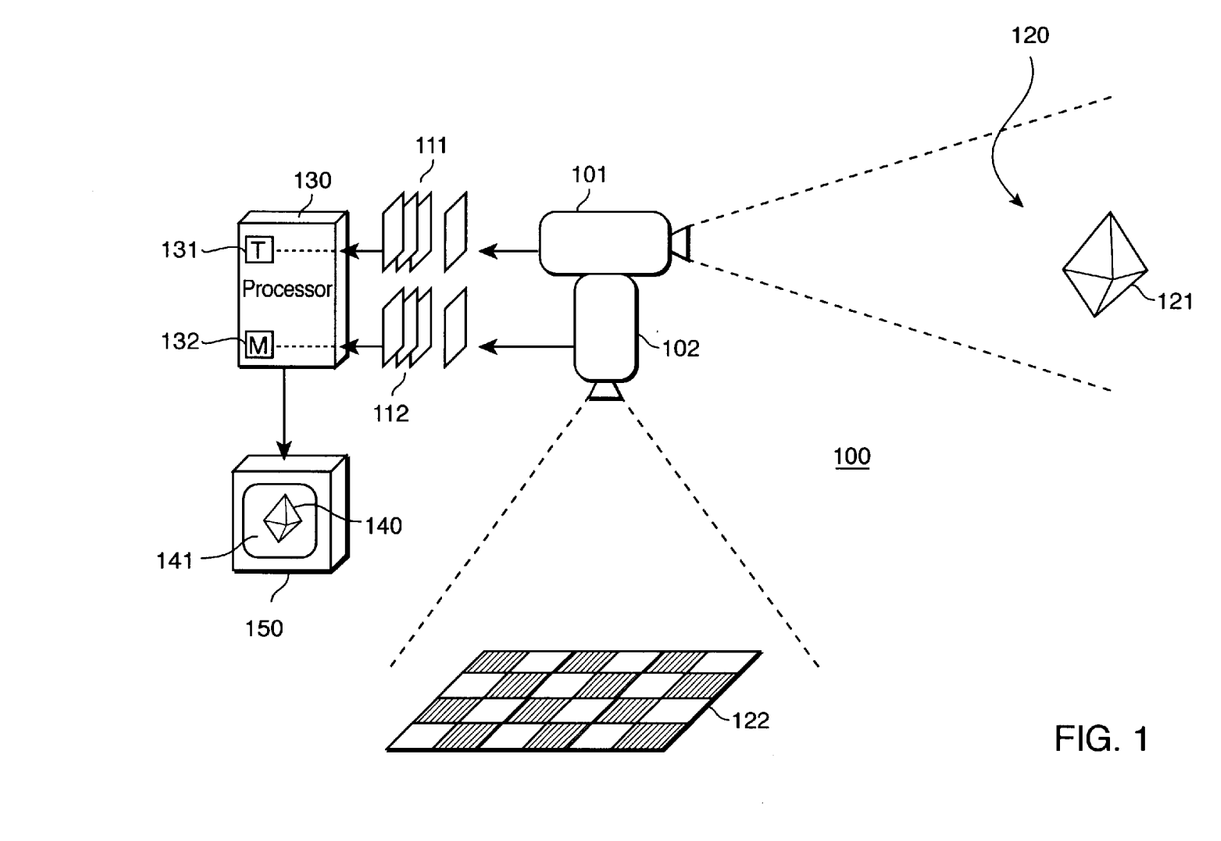
FIG. 1 is a block diagram of a 3D vision system according to the invention.

FIG. 1 shows a hand-held, mobile vision system 100 according to the invention. The system 100 includes two cameras 101–102 oriented in a fixed physical relationship to each other i.e., the camera system is internally rigid. The first camera 101 acquires first images 111 of a scene 120 having unknown characteristics. The scene 120 can include an object 121 of interest. The second camera 102 acquires corresponding second images 112 of a scene or object 122 having known characteristics. For example, it is known that characteristics of the scene 122 include rigid structures, or a registration pattern (checkerboard) of known geometry, or a moving object with known motion, or known color features.

The fixed physical relationship of the two cameras is unusual because the field of views of the first and second camera do not need to overlap, as in prior art stereoscopic systems. Even if there is accidental overlap in the images, the fact that portions of the images overlap is irrelevant for determining positional information of the cameras as described below.

At this point, several important distinctions can be made. First, the pair of images do not have to overlap in their field of view, so there is nothing in the second images that can tell one anything about the first images. Second, the function of the first camera 101 and the processing 131 on the first images 111 is totally different than the corresponding function and processing 132 for the second camera 102 and second images 112.

The second camera 102 is used only to determine positional information for the camera. That is the processing of the second images 112 is concerned with motion analysis (M) 132. Therefore, the content, i.e., texture, of the second image is immaterial, other than that the content has characteristics that are sufficient to determine camera motion or position.

In contrast, the processing (T) 131 of the first images 111 is concerned only with content of the images, for example, texture of the scene and the object. The processing 131 of the first images is not at all interested in determining camera position and motion, these are provided by the process 131. The first images are to be used to build an accurate 3D model of the scene as reflected in the texture of the first images.

The images 111–112 are in a digital form consisting of pixels. Pairs of images are acquired while the two cameras are in the identical position. This can easily be done by acquiring each pair of images concurrently.

Because the field of views of the two cameras are non-overlapping, as stated above, the pixels of the pairs of corresponding images 111–112 have nothing in common. That is, the set of pixels of a particular first image 111 can be disjoint of the set of pixels of the corresponding second image 112. This is unusual for vision systems. Therefore, the method according to the invention does not use stereoscopic information to derive positional information.

The images are fed to a processor 130. The processor 130 use knowledge of the scene characteristics in the second images 112 to determine the position of the second camera 102 relative to scene 122 when each second image was taken. This is done using motion analysis procedures (M) 131. Numerous motion analysis procedures for images with known characteristics are well known. Predetermined, known information about the relative position of cameras 102 and 101, described below, is then used to determine the position of the first camera 101 relative to the scene 122. Thus, the position of camera 101 can be determined for each of the corresponding first images 111. The first images 111 can then be assembled by the process (T) 132 to generate an accurate 3D model 140 of the scene 121. The model 140 can then be rendered as an output image 141 on an output device 150 as a virtual reality environment.

As shown in FIG. 1, the cameras are oriented at right angles to each other, and the field of view is less than 90°, thus, there can be no overlap in the first and second images. In this configuration, the first camera 101 can be rotated in a plane to acquire a full 360° panoramic view of the scene 120, while the second camera is rotated about an axis substantially perpendicular to the plane. It should be noted that with this configuration it is possible for the user to obtain the panorama from a set of images with negligible overlap between adjacent images, if the floor is composed of tiles, or a rug with some regular pattern. This is in contrast with prior art techniques which require a larger set of images with substantial overlap between images e.g., see U.S. Pat. No. 6,256,058 issued to Kang, et al. on Jul. 3, 2001, entitled "*Method for simultaneously compositing a panoramic image and determining camera focal length.*"

Figure 2A:
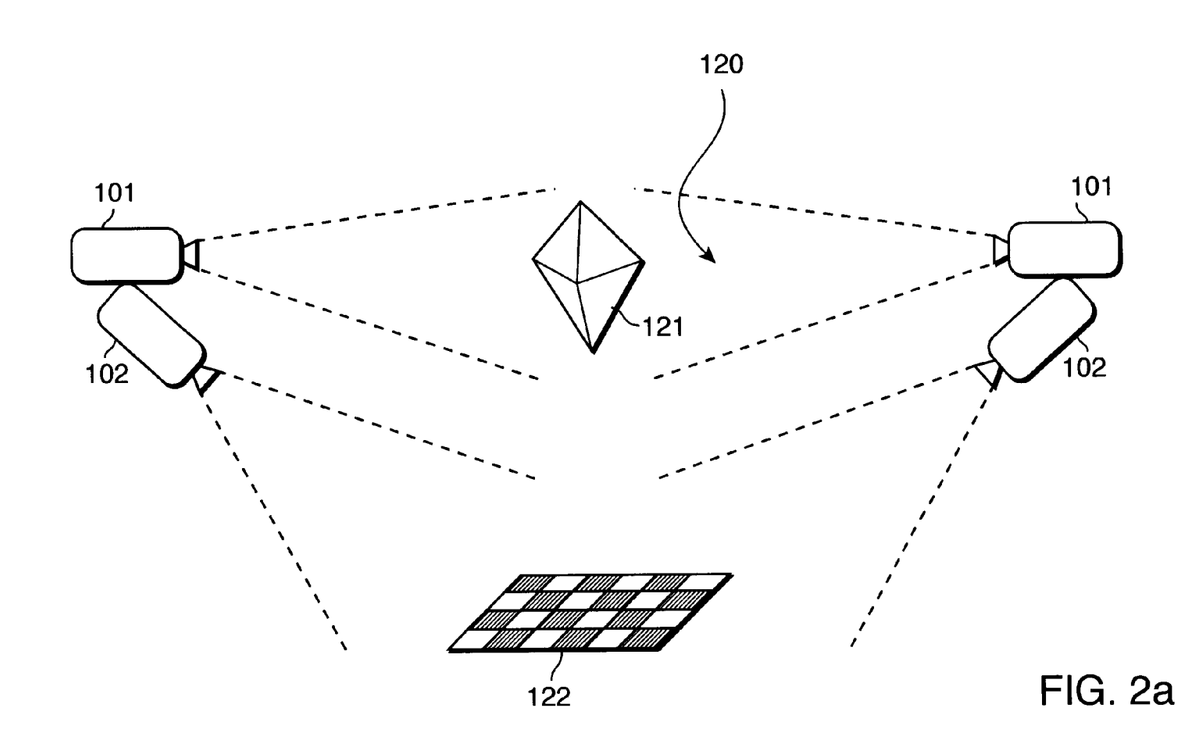
FIG. 2a is a block diagram of an alternative embodiment of the system of FIG. 1.

In FIG. 2a, the same two cameras 101–102 are oriented at an oblique angle. In this configuration case, the second camera 102 can be rotated in a circle around the scene or object 121 so that that the first camera 101 can view the object 121 from all sides, while the second camera 102 is always aimed at some relatively small position-registration pattern 122.

Figure 2B:
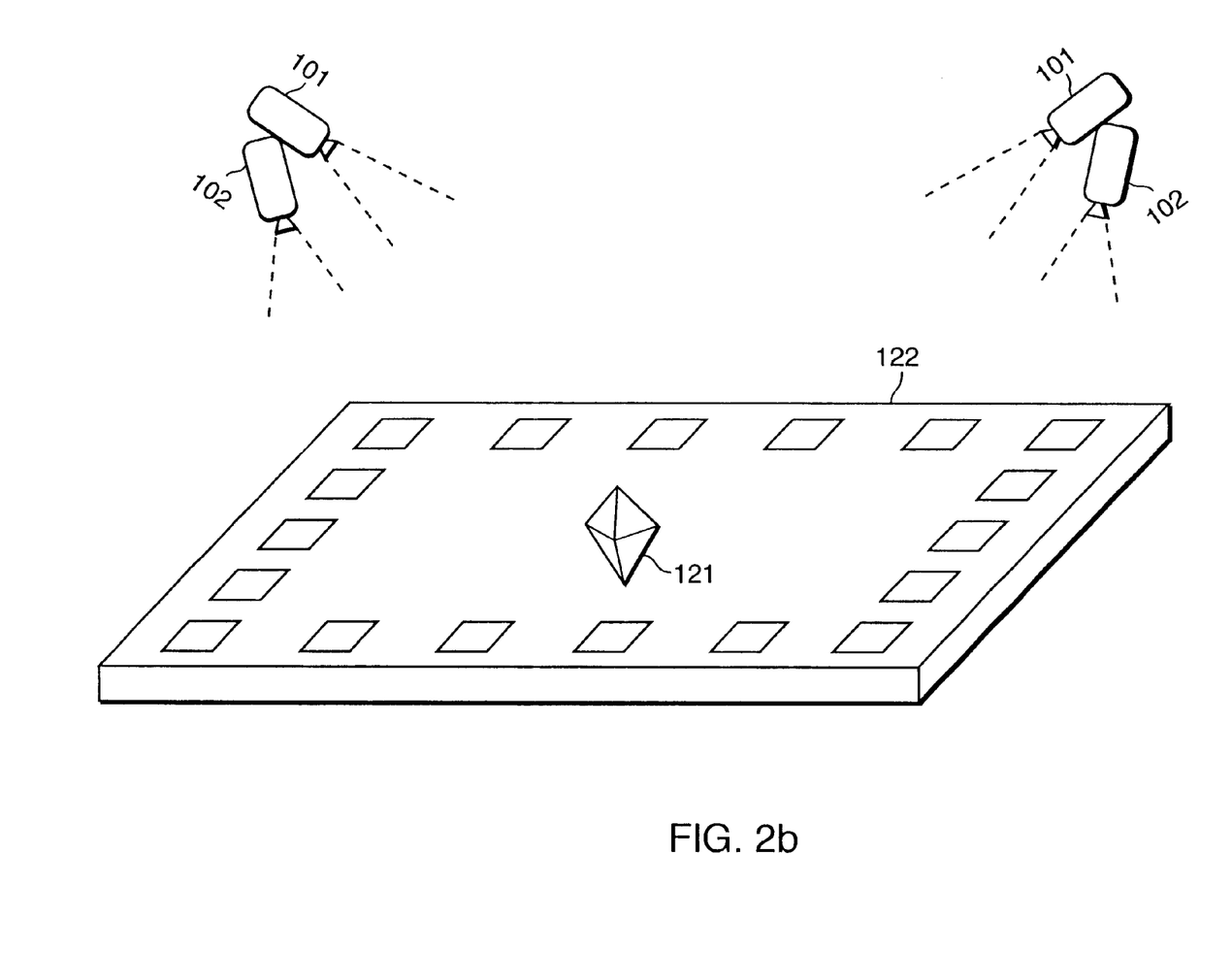
FIG. 2b is a block diagram of another alternative embodiment of the system of FIG. 1.

FIG. 2b is a configuration in which the object of interest 121 is placed on the central blank area of a planar surface, with a position-registration pattern surrounding 122 the central area. Again, this allows the cameras 101–102 to be moved around so that that the first camera 101 can view the object 121 from all sides, while the second camera 102 is always aimed at some part of the position-registration pattern 122. As an advantage, this permits the scanning of a 3D object with hand-held cameras in a setting that does not rigidly constrain the motion of the cameras, as in the prior art. This makes visions systems according to the invention affordable, and easy and fast to implement by a casual, non-professional user.

Figure 3A:
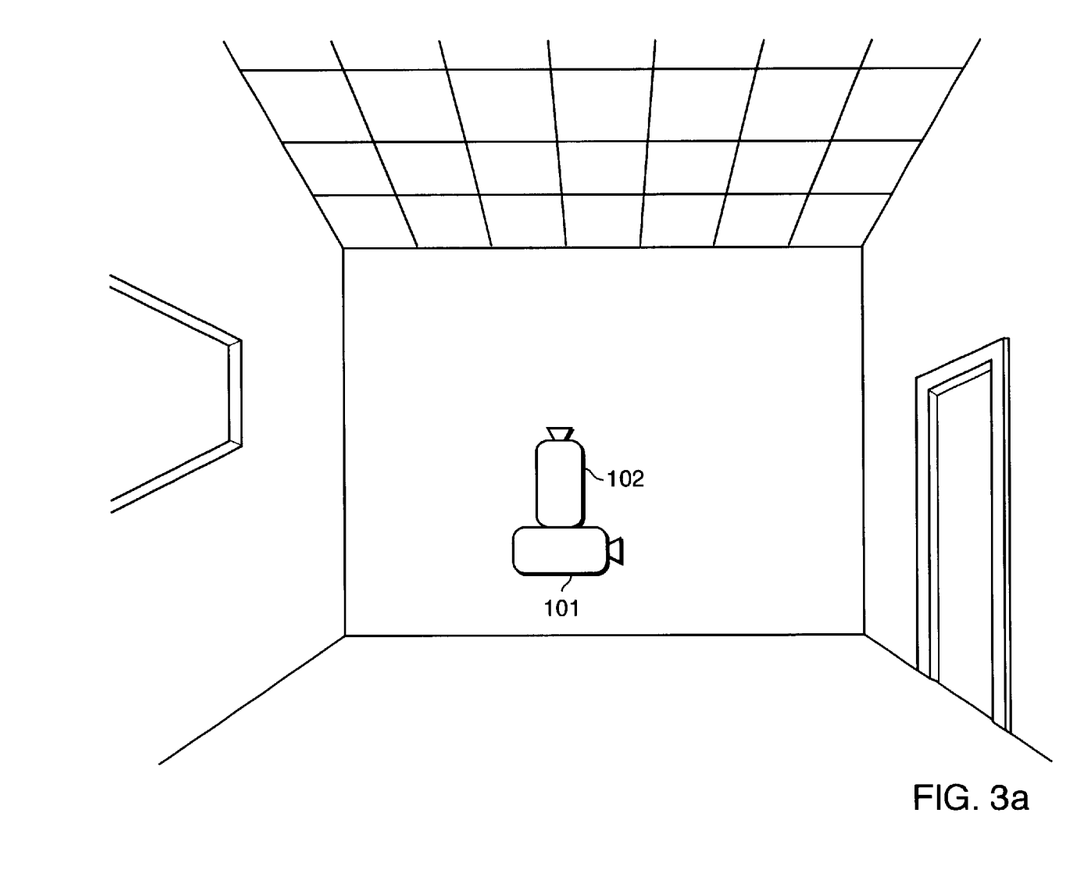
FIG. 3a is a block diagram of another alternative embodiment of the system of FIG. 1.

In FIG. 3a, the second camera 102 is inverted. Here, the first camera 101 can be used to acquire images of a building's interior during a walk-through while the cameras are moved from room to room. In this case, the position of camera 102, and hence of camera 101, is derived from a position-registration pattern on the ceiling, provided by the ceiling panels, or perhaps, the sharp, rigid edges where walls and ceiling meet.

This orientation, like the orientation of FIG. 1 is useful for acquiring panoramas, a frequently performed activity in vision systems. In the prior art, a panorama typically requires that there is substantial overlap in adjacent images. With the system according to the invention, there is no requirement that adjacent scene images have significant overlap.

Figure 3B:
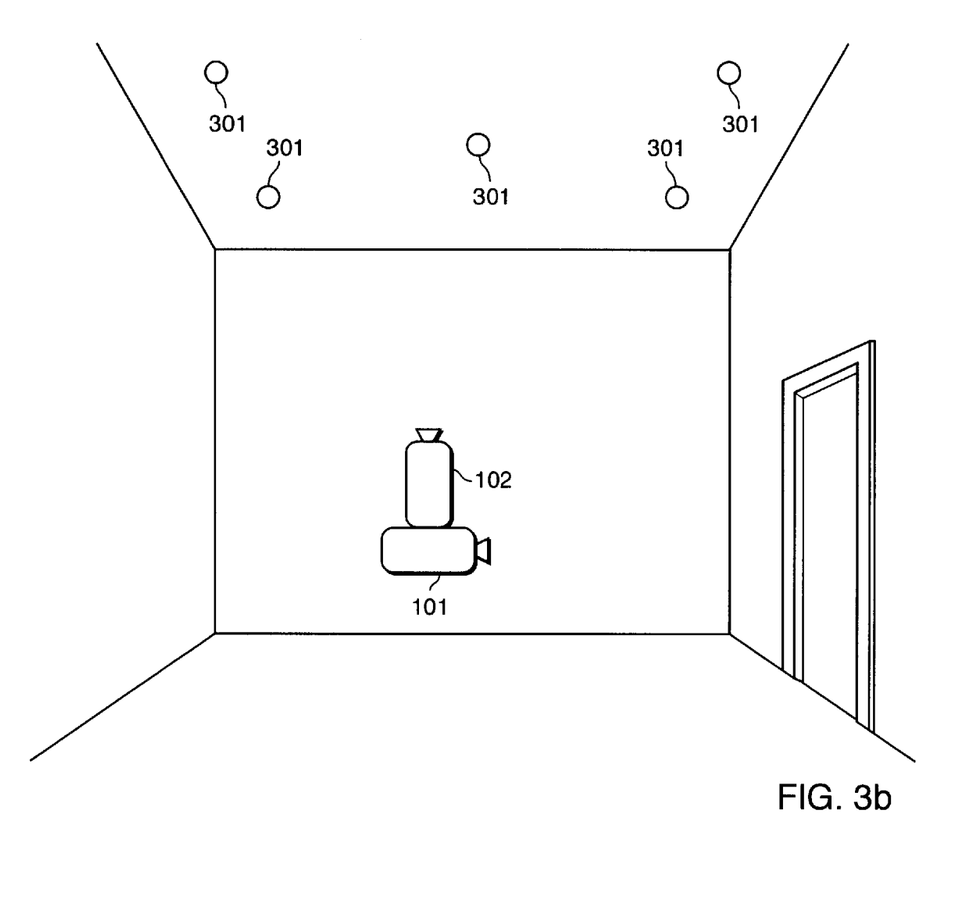
FIG. 3b is a block diagram of another alternative embodiment of the system of FIG. 1.

In FIG. 3b, the camera configuration is the same as in FIG. 3a, but visual beacons 301 have been attached to the ceiling at known positions. Each visual beacon has a distinct identity, for example a color-coding which distinguishes it from all other beacons. The visual beacons are identified in second images 112, and the position of camera 102, and hence the position of camera 101, is computed relative to the beacons.

Figure 3C:
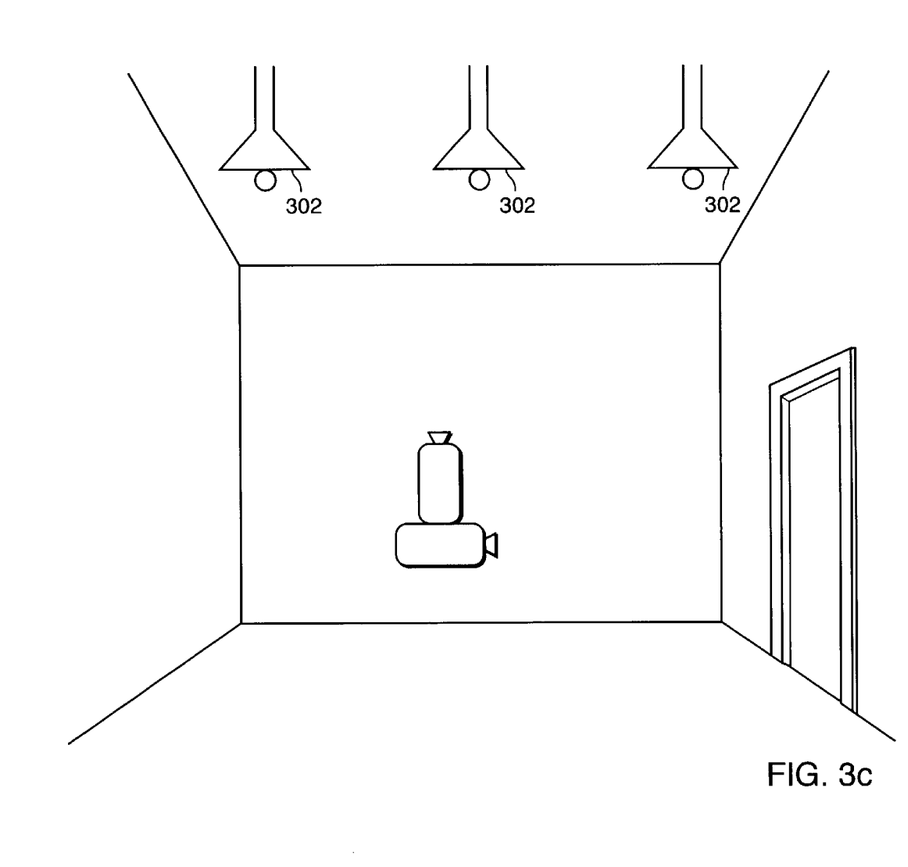
FIG. 3c is a block diagram of another alternative embodiment of the system of FIG. 1.

In FIG. 3c, the second camera 102 is viewing some arbitrary rigid, 3D structure 302 on the ceiling. Again, the motion of camera 102 is computed from the images, and the computed motion of 102 is used to determine the motion of camera 101. This requires a more complicated motion-recovery algorithm than in the case where the camera views a regular grid of ceiling panels.

Figure 3D:
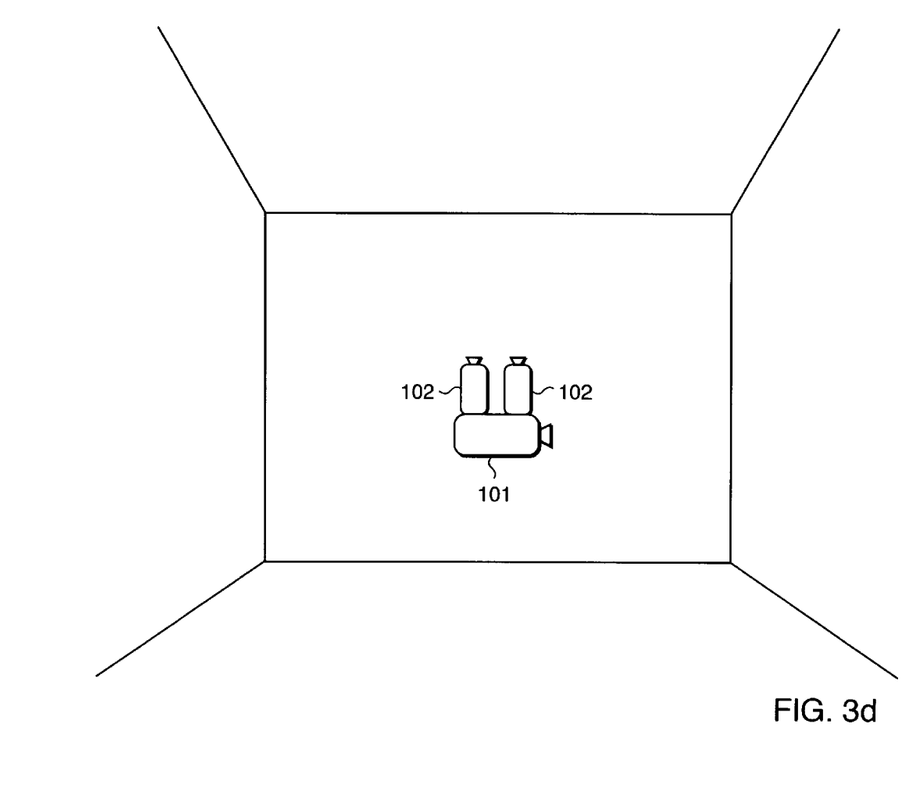
FIG. 3d is a block diagram of another alternative embodiment of the system of FIG. 1.

In FIG. 3d, there are two cameras 102 used for determining positional information. The cameras 102 are arranged as a conventional stereo system with overlapping fields of view between the cameras 102, and are viewing some arbitrary 3D structure on the ceiling. Note, however, consistent with the above described arrangement, the images acquired by the second cameras 102 do not overlap with any images of the first camera 101, and even if they do, that is immaterial. The motion of the stereo system is computed from the images by an appropriate process for finding the motion of a rigid stereo system, and is used to determine the motion of camera 101. As an advantage, the stereo cameras providing reliable 3D measurements at each camera location, enabling computation of more accurate motion information of the system than is the case with a single camera.

Figure 4:
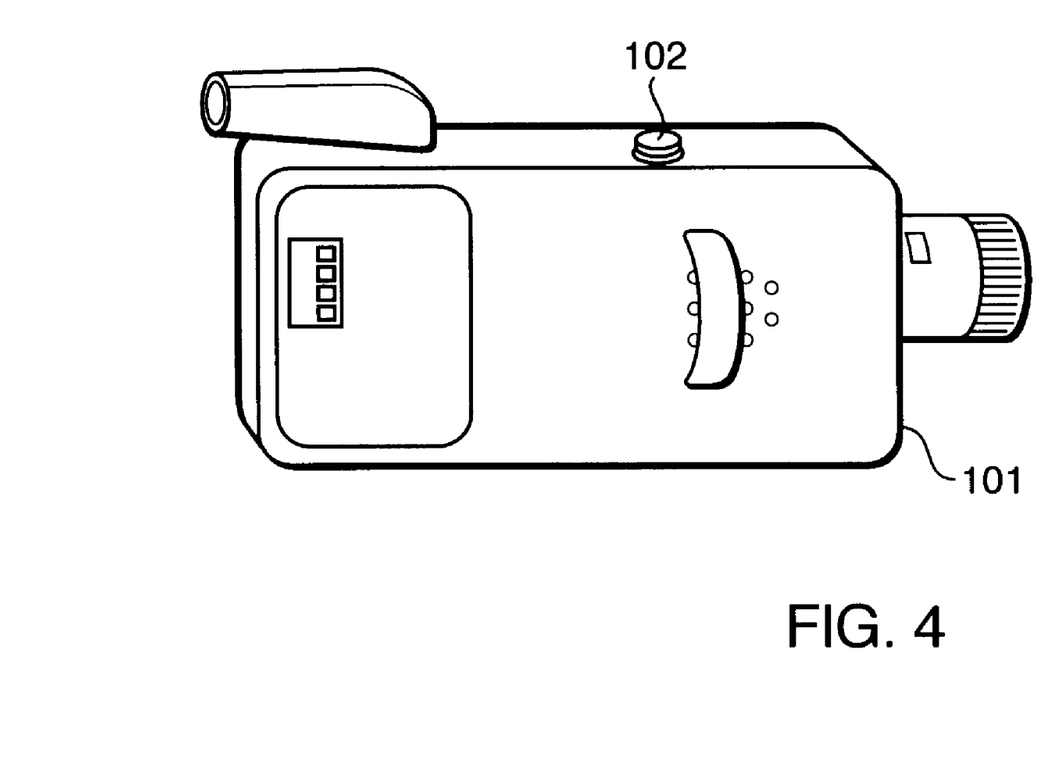
FIG. 4 is a side view of an embodiment of the system with a removable second camera mounted on a body of the first camera.

Although FIGS. 1–3a–d show two separate cameras fixed to each other, it should be understood that the two cameras can be mounted in a single camera body as shown in FIG. 4. The second camera 102 can be removable mounted on the body of the first camera 101, using, for example, a Velcro fastener.

Because the two cameras are used for two totally different purposes, the cameras themselves can be configured to maximize the functionality for each purpose. The first camera, which takes images of the view of interest, can use a high-quality, color sensor and high quality lens. The second camera 102 can use a relatively inexpensive low-resolution monochrome sensor and low quality lens. In order to improve the accuracy of the computed camera motion, the field of view of the second camera can be substantially larger than the field that of the first camera.

Figure 5:
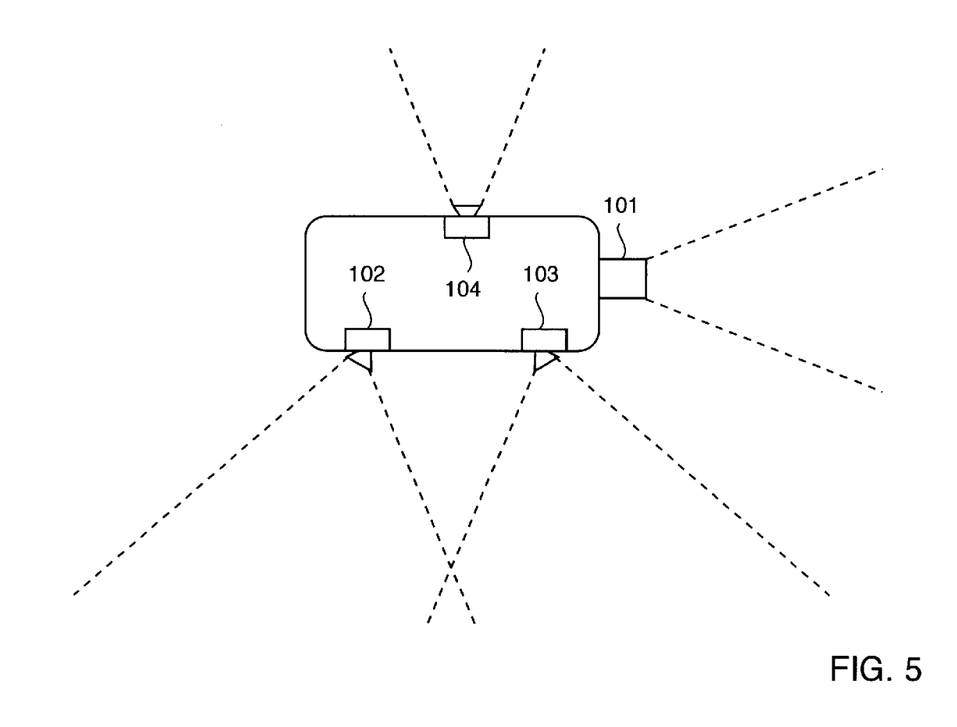
FIG. 5 is a side view of an embodiment with multiple cameras.

FIG. 5 shows a configuration where multiple cameras 102–104 are used to acquire images of known geometry. This makes it more likely that the position-registration pattern is in the field of view of at least one camera.

Calibration

Before the images 111–112 are acquired, a calibration method is performed to obtain the relative position (translation and rotation) of the two cameras 101–102. Methods for calibrating cameras manually, or for automatically calibrating stereo cameras, i.e., cameras which overlap in their field of views, are well known. However, automatically calibrating cameras with no overlapping field of view, as described for the invention, requires special techniques. Although this description details a system with two cameras, it should be understood that the method could be extended to systems with three or more cameras.

Figure 6:
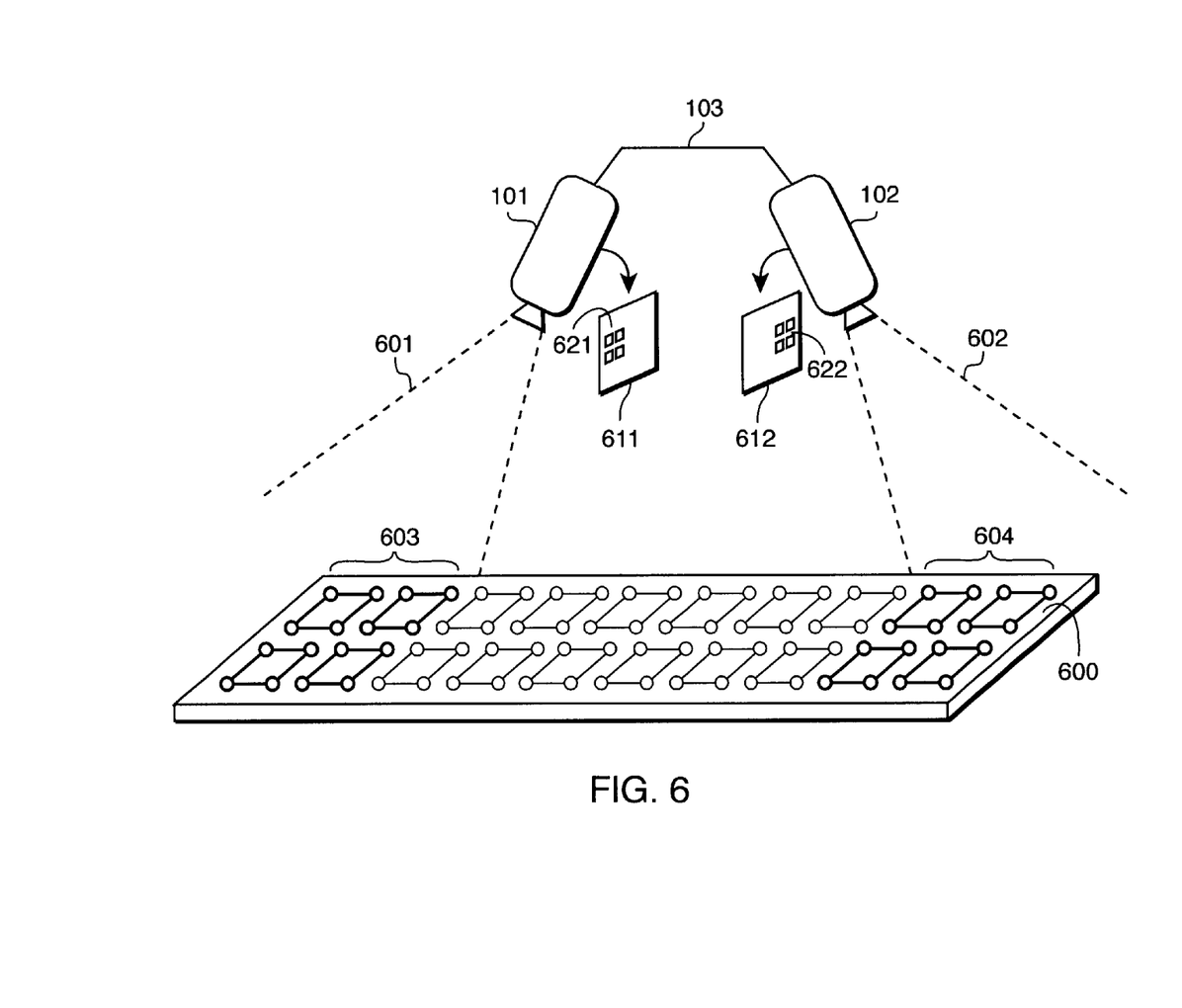
FIG. 6 is a schematic of a calibration set-up according to the invention.

FIG. 6 shows the basic principle of the calibration method and set-up according to the invention. In one embodiment, the calibration set-up uses a planar calibration pattern 600. Here, the two cameras 101–102 are fixed to each other by means 103 so that the field of views 601–602 of the two cameras are non-overlapping, as described above. The two cameras 101–102 acquire a pair of images 611–612 of the calibration pattern 600.

The calibration method has two components—calibration of the intrinsic parameters of each camera, and calibration of the extrinsic parameters, i.e., the relative position, of the two cameras. The intrinsic parameters are calibrated using standard techniques. The technique for calibrating the extrinsic parameters uses a calibration pattern and works in the following way. First, a partial image of the calibration pattern is acquired by each camera. Second, the appearance of the full calibration pattern is synthetically generated for each camera as it would appear if the camera were able to image the entire pattern simultaneously. Third, standard techniques for stereo calibration can be used on the synthetically generated information because it simulates the situation where there is common structure visible by both two cameras.

The pattern 600 includes calibration points $p_i$ 603, which are visible in camera 101, and $q_i$ 604, which are visible in camera 102. Each of $p_i$ and $q_i$ is a subset of the full set of calibration points $r_i$ of known geometry. The points can be vertices of squares of a checkerboard, for example. A black and white checkerboard pattern is a frequently used design for calibrating cameras because the vertices of the squares can be found to a high accuracy. However, it should be understood that the pattern 600 can be any arbitrary design, as long as it has a known geometric structure, i.e., all the positions of the calibration points of the pattern 600 in the physical world are known.

Camera 101 acquires the first image 611 including pixels $a_i$ 621 which are the images of $p_i$ 603 while camera 102 acquires the second image 612 including pixels $b_i$ 622 which are the images of $q_i$ 604. As stated above, the points $p_i$ are disjoint from the points $q_i$, and hence the pixels $a_i$ and $b_i$ have no physical calibration points in common. Here, pixels $a_i$ 621 and pixels $b_i$ 622 are in independent image coordinate systems, obtained under perspective projection. In contrast, the corresponding points $p_i$ and $q_i$ are measured in a single coordinate frame which is the true, metric coordinate frame for the physical calibration pattern 600.

Thus, the coordinates of the calibration points $p_i$ 603 are known in the coordinate frame of the calibration pattern. Also, the image coordinates of the image points $a_i$ 621, which correspond to $p_i$, are known in the image coordinate frame. These correspondences can then be used to determine the planar homography H which describes the mapping between the calibration points $p_i$ 603 and the pixels $a_i$ 621.

Note, that the computed transformation H can be applied to any point in the plane of the calibration pattern 600. Thus, the transformation can be applied to all calibration points of the pattern 600 to determine the expected image positions of calibration points in image 611 acquired by first camera 601. The full, synthesized set of mapped points is $Hr_i$. The fact that some of the points have image coordinates outside the bounds of any one image 611 of the camera 101 is irrelevant for their subsequent use in the present calibration process.

The same reasoning as above applies to the second camera 102. In this case, the transformation is G. Then, the calibration points of the full pattern 600 map to a full, synthesized set of image points $Gr_i$, which describe the expected positions of the full set of calibration points in an image acquired by the second camera 102.

Again, some of these points will lie outside the field of view of an actual image 622, but this is immaterial.

Figure 7:
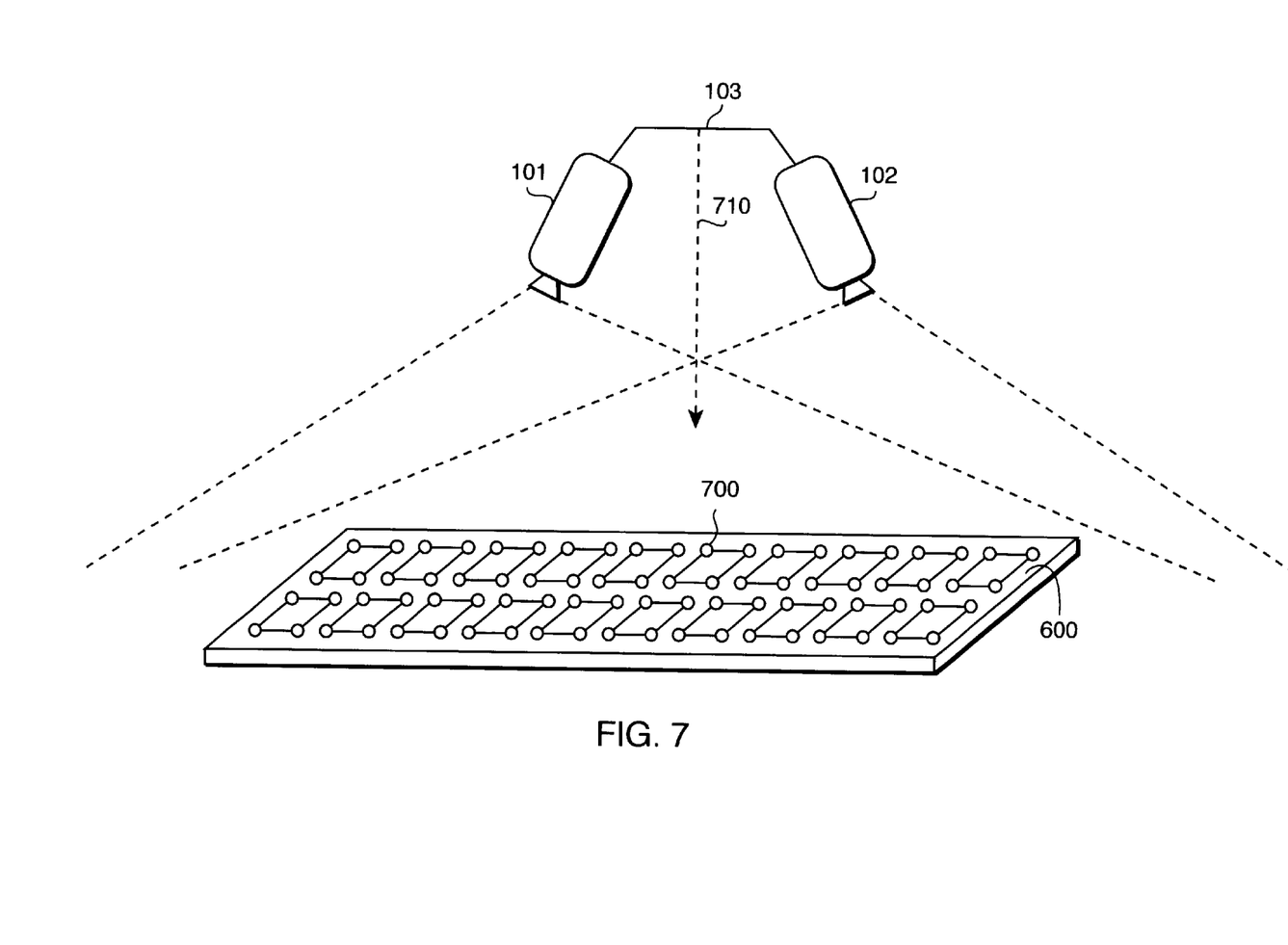
FIG. 7 is a schematic of a synthesized stereo calibration set-up.

The situation is now effectively as shown in FIG. 7. The exact pixel location for every point in full pattern 600 can be determined even though the parts of the pattern beyond the bounds of the real images 611 and 612 of FIG. 6 have been generated synthetically. Thus, for a particular point $r_m$ 700, the stereo image match between the image $Hr_m$ of $r_m$ in camera 101 and the image $Gr_m$ of $r_m$ in camera 102 is known. The full set of synthesized stereo matches is used as an input to a known technique of stereo camera calibration to determine the relative position (translation and rotation) of the two cameras 101–102.

For this calibration process, a single position of the camera system relative to the calibration plane is not sufficient for an exact calibration. However, two or more relative positions of system and calibration pattern, with generation of the information above at each position, does yield sufficient information to do the exact calibration.

Determination of Pattern Parts for Partial Views

Part of the calibration processing above needs to determine which specific part of the full pattern 600 is visible in a partial image. This could be done manually. However, given a partial image of the checkerboard pattern, it is of course impossible to tell automatically what specific part of the pattern is imaged without additional identification information on the rows and column of the squares. Therefore, an automatic identification method is provided.

Figure 8:
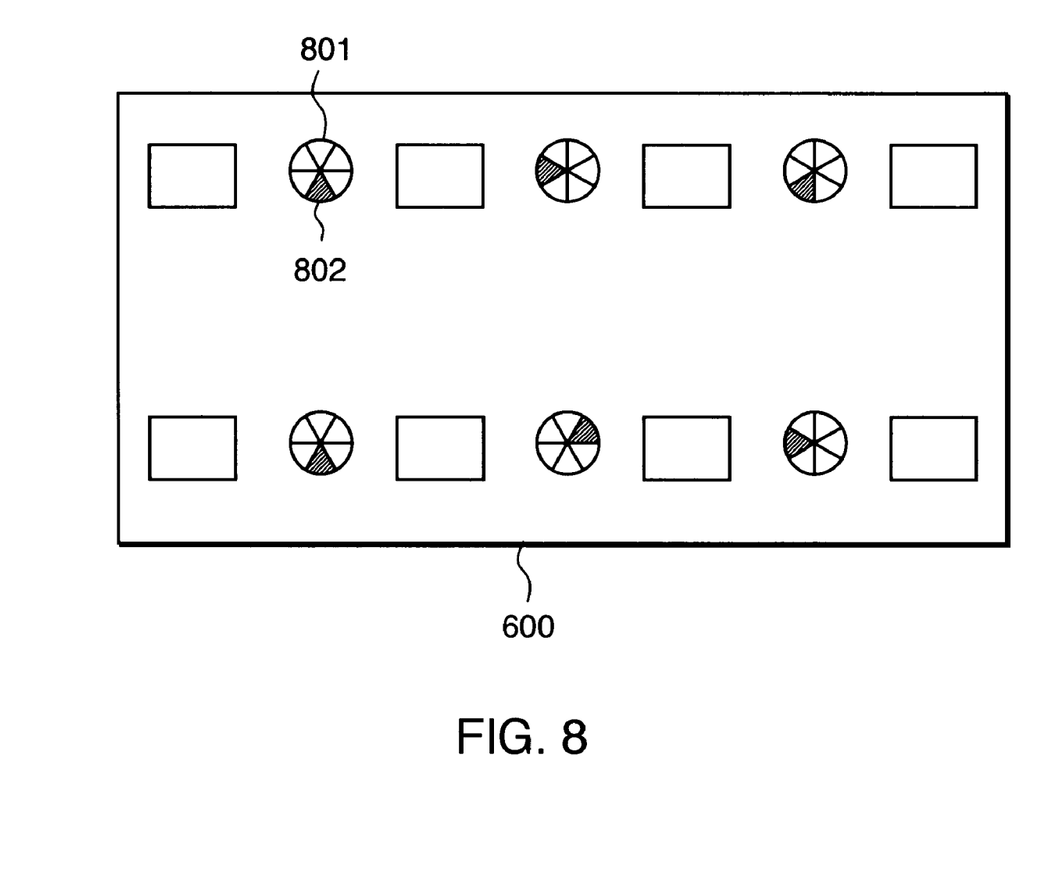
FIG. 8 is a schematic of the calibration pattern of FIG. 6 with visual identification information.

FIG. 8 shows the calibration pattern 600 with identification information or "visual tags" 801. Each visual tag 801 is a circle with multiple segments. One segment 802 in each tag 801 is black, and marks the starting point for circularly traversing the remaining segments. The remaining segments are colored. Typically, four to six different colors are used to allow a large number of distinct tags. For example, a tag design with four segments (not including the black start segment) and five colors provides $5^4$ or 625 unique color codings. These tags can be detected and identified automatically to determine which part of pattern 600 is visible. The tags 801 are described in U.S. patent application Ser. No.

09/628,461 "Badge Identification System" filed by Beardsley on Jul. 31, 2000, incorporated herein in its entirety by reference.

Obtaining High Accuracy

A fundamental aspect of the calibration method is that each camera 101 and 102 views less than the complete calibration pattern 600, but synthetically generates a complete view of the pattern. This is an extrapolation process in which the visible part of the pattern is used to infer the appearance of the pattern for areas beyond the physical bounds of the image. Extrapolation is a sensitive process, and the further the extrapolated data is from the original measurements, the greater the error. This raises the question of how errors due to extrapolation can be kept to a minimum.

If the extrapolation error was not an issue, calibration could be achieved using two positions of the camera system relative to the calibration pattern 600. For each position, a minimum of four calibration points would be recorded. This would provide a minimum of eight calibration points, taken for two different relative positions between rigid camera system and calibration pattern, and this is sufficient for calibration.

To reduce error due to extrapolation, the four points at each position are not chosen arbitrarily, but are chosen to lie close to the midpoint of a projected line 710 between the cameras, as shown in FIG. 7. This midpoint is straightforward to compute. The accuracy is further improved by taking many more than two relative positions of the camera system relative to the calibration pattern, and using a least-squares approach in the calibration.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for constructing a 3D model of a scene, comprising:
   acquiring first images of a first scene having unknown characteristics by a first camera;
   acquiring corresponding second images of a second scene having known characteristics by a second camera, the first and second cameras having a fixed physical relationship to each other;
   analyzing only the second images to determine corresponding positions of the second camera while acquiring the first images; and
   assembling only the first images into a 3D model using the determined corresponding positions and the fixed physical relationship of the first and second camera.

2. The method of claim 1 further comprising:
   rendering the 3D model on a display device.

3. The method of claim 1 wherein the known characteristics of the second scene include a rigid structure.

4. The method of claim 1 wherein the known characteristics include a position-registration pattern.

5. The method of claim 1 wherein the known characteristics include a fixed set of visual beacons, each with a unique distinguishable identity.

6. The method of claim 1 wherein the known characteristics include a moving object with known motion.

7. The method of claim 1 wherein the first scene includes a 3D object, and the 3D model assembled from the first images corresponds to the 3D object.

8. The method of claim 1 wherein pixels of a particular first image and a corresponding particular second image are disjoint.

9. The method of claim 1 wherein a particular first image and a corresponding particular second image are acquired concurrently.

10. The method of claim 1 wherein the first and second cameras are hand-held while acquiring the first and second images without constraining motions of the first and second cameras.

11. The method of claim 1 wherein the first camera is oriented at right angles with respect to the second camera, and the first and second cameras each have a field of view less than 90°.

12. The method of claim 11 wherein the first camera is rotated in a plane while the second camera is rotated about an axis substantially perpendicular to the plane to acquire a panoramic view of the first scene.

13. The method of claim 1 wherein the first camera is oriented at an oblique angle with respect to the second camera, and the second camera is rotated in a circle while acquiring the first and second images to a view of all sides of an object in the first scene.

14. The method of claim 1 further comprising:
   placing a position-registration pattern in the second scene, the position-registration pattern having a central blank central area to form the first scene;
   placing an object in the central blank area; and
   moving the first camera around the object, and aiming the second camera at the position-registration pattern while acquiring the first and second images.

15. The method of claim 1 wherein the first scene is an interior of a building and the second scene includes rigid architectural details of the building.

16. The method of claim 15 wherein the rigid architectural details are ceiling tiles.

17. The method of claim 1 further comprising:
   acquiring corresponding third images of the second scene by a third camera, the third came as having a fixed physical relationship to the first and second cameras, and the third images overlapping with the second images.

18. The method of claim 1 wherein the first and second cameras are mounted within a single camera body.

19. The method of claim 1 wherein the second camera is removable mounted on the first camera.

20. The method of claim 1 wherein the first camera has a high-resolution color sensor and the second camera has a low-resolution monochrome sensor.

21. The method of claim 1 wherein a field of view of the second camera is substantially larger than a field of view of the first camera.

22. The method of claim 1 further comprising:
   calibrating the first and second cameras using a planar calibration pattern having identification information.

23. The method of claim 22 further comprising:
   acquiring first calibration images of the calibration pattern with the first camera:
   acquiring a corresponding second calibration image for each first image, the first image and the corresponding second image being non-overlapping; determining a first planar homography between each first image and the calibration pattern to generate a first synthetic calibration pattern;
   determining a second planar homography between each second image and the calibration pattern to generate a second synthetic calibration pattern; and deriving a relative pose of the first and second camera from the first and second synthetic calibration patterns.

24. An apparatus method for constructing a 3D model of a scene, comprising:
   a first camera configured to acquire first images of a first scene having unknown characteristics;
   a second camera having a fixed physical relationship to the first camera, the second camera configured to acquire corresponding second images of a second scene having known characteristics;
   means for analyzing only the second images to determine corresponding positions of the second camera while acquiring the first images; and
   means for assembling only the first images into a 3D model using the determined corresponding positions and the fixed physical relationship of the first and second camera.

* * * * *